(12) United States Patent
Monzar

(10) Patent No.: US 9,013,968 B2
(45) Date of Patent: Apr. 21, 2015

(54) DATA STORAGE SYSTEM AND APPARATUS

(71) Applicant: Gregory R. Monzar, Etobicoke (CA)

(72) Inventor: Gregory R. Monzar, Etobicoke (CA)

(73) Assignee: Nanometer Storage Corporation (California), Toronto, Ontario (CA)

( * ) Notice: Subject to any disclaimer, the term of this patent is extended or adjusted under 35 U.S.C. 154(b) by 44 days.

(21) Appl. No.: 13/986,661

(22) Filed: May 22, 2013

(65) Prior Publication Data

US 2014/0347966 A1    Nov. 27, 2014

Related U.S. Application Data

(60) Provisional application No. 61/688,847, filed on May 23, 2012.

(51) Int. Cl.
*G11B 11/00* (2006.01)
*G11B 11/20* (2006.01)

(52) U.S. Cl.
CPC .................... *G11B 11/20* (2013.01)

(58) Field of Classification Search
USPC ............ 369/13.56; 347/15, 19, 40, 43, 47, 5, 347/10, 1, 22; 348/164, 734; 358/1.8, 2.1; 101/2
See application file for complete search history.

(56) References Cited

U.S. PATENT DOCUMENTS 8,201,911 B2 *   6/2012   Tatsumi ........................ 347/15

* cited by examiner

*Primary Examiner* — Ali Neyzari

(57) ABSTRACT

A data storage system, having a data processor operable to convert digital data signals into ink dot patterns, and a data processor operable to receive the ink dot patterns and convert them into digital signals, the system having at least one print media receiving carrier or panel, a printing member operable to deposit ink dot patterns in a print medium on the carrier panel, and a print media reader operable to read the ink dot patterns and create data signals there from, and a method of storing and retrieving data.

11 Claims, 5 Drawing Sheets

DATA STORAGE SYSTEM AND APPARATUS

FIELD OF THE INVENTION

This application is based on U.S. Application 61/688,847. filed May 23, 2012. Title: Data Storage System & Apparatus; Inventor: Gregory R. Monzar, the priority of which is claimed. The invention relates to a data storage system and apparatus for storing digital data, and in particular to a system in which digital data is stored in machine readable characters, on a substrate or carrier, and to a system for reading such characters and retrieving such data for processing.

BACKGROUND OF THE INVENTION

Digital binary data stored on hard drives consists essentially of a series or so called binary bits or 'strings' of magnetic domains on the storage medium with specific polarities corresponding to the positive and negative voltages the hard drive applies to the write head. Each such signal constitutes an individual magnetic impulse. The magnetic flux reversals from the boundaries between the areas of positive and negative polarity that the drive controller uses to encode the digital data onto the analog recording medium. During a read operation, each flux reversal the drive detects, generates a positive or negative pulse that the device uses to reconstruct the original binary data. A single ASCII (American Standard Code for Information Interchange) character, be it a letter, numeral, symbol or control character can be converted into binary consisting of eight or more binary 'bits' of such data.

Storage of such digital data has for many years been carried out by simply recording each string of magnetic impulses, on a magnetic medium. In many cases this medium is a disc coated with ferromagnetic material. Such discs have been used as so called 'floppy discs', and more advanced discs are used in so called 'hard drives'. The disc spins at a high speed. A recording head records the impulses, for storing the data on the disc. Retrieval is made by a read head which reads the impulses, when it is required to retrieve the data. Such disc drives have for some time been subject to finite limits in the amount of data that can be stored in this way, due to the difficulty in resolving increasingly smaller polarized magnetic zones.

However the increasing complexity of programs and applications, require ever increasing storage capacity. Hard drives are now reaching the upper limits of storage density due to the limited quantity of magnetic flux reversals available per inch squared on the recording medium. Multiple hard drives are common in enterprise and cloud operations. Hard drives with ultra high speeds and high densities are available. Hard drive stored data is also susceptible to electro-magnetic flux interference from many electromagnetic sources which can damage the stored data making it unreadable. Hard drives are notoriously unreliable and have necessitated additional industries to account for their failure prone operation.

None of the improvements can keep pace with demands for more and more storage capacity. The pace of hard drive capacity development has not kept up with the pace of microprocessor development.

Another problem is that as the sheer size of the hard drive, or drives, increases, the speed of recording and retrieval must inevitably be reduced. One basic problem with storing digital data is the magnetic impulses in which the data is encoded.

In hard disk drives, each circular track is divided into physical sectors made up of three basic parts: the sector header, the data area and the error-correcting code (ECC). In the data area, a sequence of eight magnetic bits or impulses is used to represent for example in ASCII character. It is apparent that any storage system based on storing the strings of binary data bits as magnetic impulses, is not going to satisfy the needs both for more storage and also improving recording and retrieval speeds.

Preferably any such data storage system will have a physical "footprint" which is more or less the same as that of the known types of hard drive.

Preferably such a system will use technology which exists, albeit in other applications, rather than requiring extensive experimentation and research into some entirely new and experimental field of technology, which may take many years to investigate and design into a practicable form, which would be capable of being made and sold and serviced, by existing technicians.

BRIEF SUMMARY OF THE INVENTION

With a view to satisfying the foregoing objectives, the invention provides a data storage system, and comprising , a data processor operable to convert digital data signals into ink droplets of various size, shape, translucence, volume and chromatic properties to yield static graphic symbols, at least one print media receiving carrier or panel, a printing member operable to deposit graphic droplets in a print medium on said carrier panel, and a print media reader operable to read said graphic symbols and create data signals therefrom, and a data processor operable to receive said data signals and convert them into digital signals.

Preferably the data processors for such a system are basically known per se, subject to adaptation as required to enable the rapid conversion of data carried in electronic bit streams into graphic symbols, and when recovering such data, to convert such graphic symbols back into electronic bit streams for processing in the usual manner.

Preferably MEMS based print heads are used which are capable of depositing ink droplets of varying characteristics that are fractions of one micron in diameter; and preferably CMOS based optical readers and signal processing software are available which can read such sub-micron diameter graphic characters.

Preferably, the actual carrier or media on which such graphic symbols are printed will be reusable, many times over. Such carriers will be compact and light, and capable of storage, with graphic symbols printed thereon for extended periods of time.

Preferably the carriers are easily handled and capable of being mass produced, at reasonable cost.

Preferably the system for storing the media, and for printing and recovering the data should, if possible, be sufficiently compact that it will adapt to use with at least some existing data processing equipment.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Before describing the apparatus in detail, it will be pertinent to the understanding of the invention to appreciate the basic system.

The fundamental problem with digital signals is the simple binary code in which they are written. Such a code is primitive. It consists essentially of magnetic signals which are either +1, or −1. This simple system requires a large number of combinations of such 'bits' to represent a single letter or number.

In the present invention this basic digital or "binary" data, is converted, or encoded into graphic symbols or ink droplet variants of either or all of:
i) ink droplet diameter;
ii) ink droplet volume;
iii) ink droplet shape;
iv) ink droplet colour or chromatic variant
v) ink droplet relationship to printable carrier platen fiducial reference marks.

These symbols may simply be letters. But they may also be any number of specially created symbols, having no meaning to a person. Such graphic symbols can thus be generated by the device in a large number of designs based on the input data stream. It will be appreciated that by means of such a highly flexible and expandable system of symbols, it becomes possible to ensure that one symbol represents a single letter, which was previously represented by eight, sixteen or thirty-two magnetic 'bits'. But this system goes much further than that. A graphic symbol comprising ink droplet variants can be generated by the system which represents a whole word, a phrase, or even a whole document of ASCII characters.

Within the given square area allocation on the print medium for each individual graphic character exponential mathematical variants can be applied to character generation through ink droplet variations. A string of ASCII characters then can be translated into binary and then re-encoded by the system as individual and unique graphic characters. Symbols can be designed to represent formulae, complete names and addresses, or even a full document.

The system is 'open ended' and is expandable, without limits, except the imagination of the creator.

Once the data is encoded into such ink dot symbols, it is then printed onto a printable carrier or media. Preferably the carrier will be for example a glass, treated glass or synthetic panel, and the symbols will be printed in a form of glycol based ink or other proprietary ink formulation. The printing of each symbol will be in sub-micron size, so that large numbers of symbols can be printed on a single panel.

The ink or other medium will be erasable, when the data is no longer required.

Preferably there will be a plurality of panels, each of which can be printed on both sides. Transport mechanism will move panels from a storage area into an active area, and back again, as required.

A symbol reader can scan the symbols and retrieve data as required.

The data is then reprocessed back into a form, suitable for connection to standard interfaces used in computer and computer networking systems.

Figure 1:
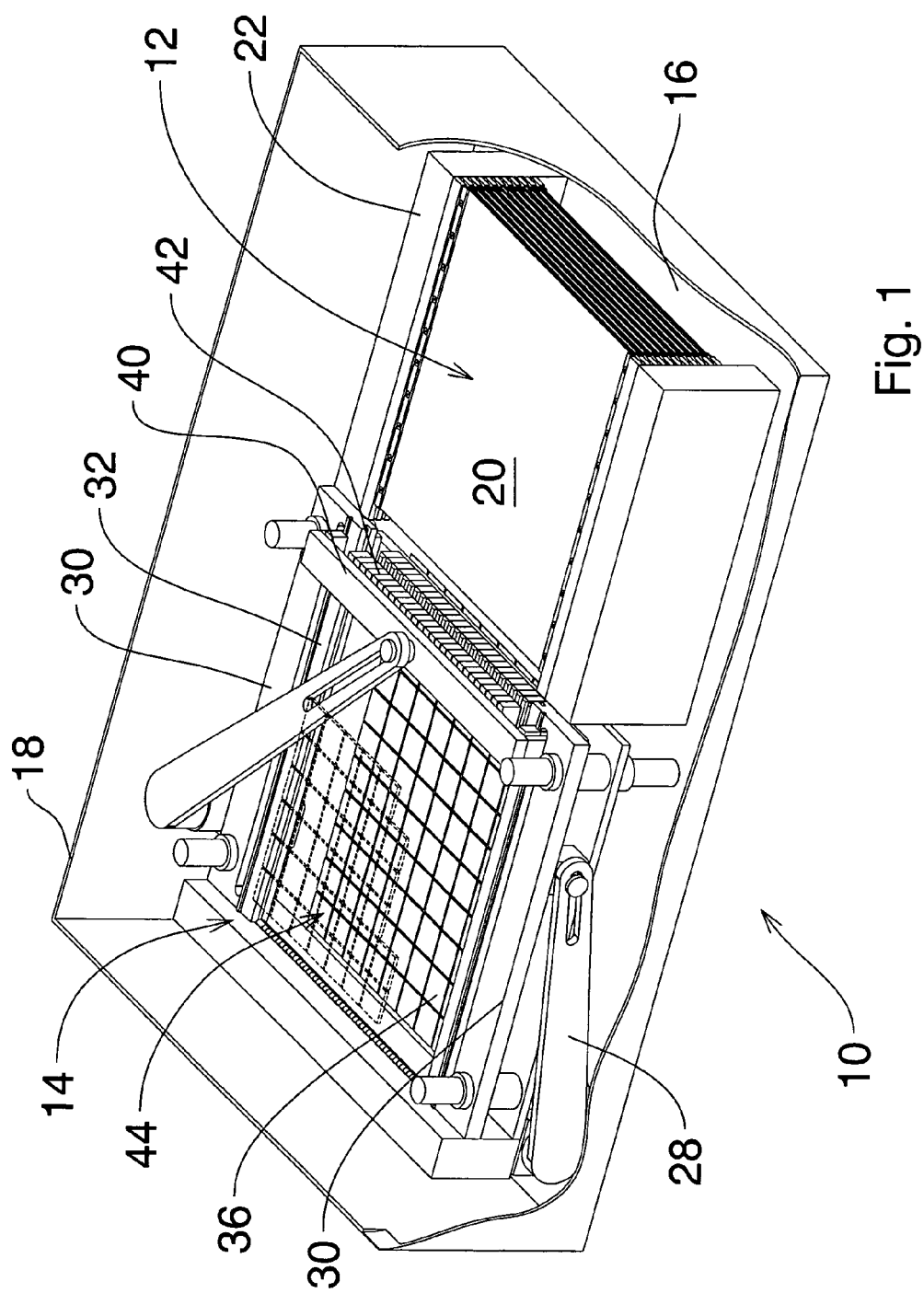
FIG. 1 is a schematic perspective of a data storage apparatus illustrating the invention, and showing the components in a first position.
Figure 2:
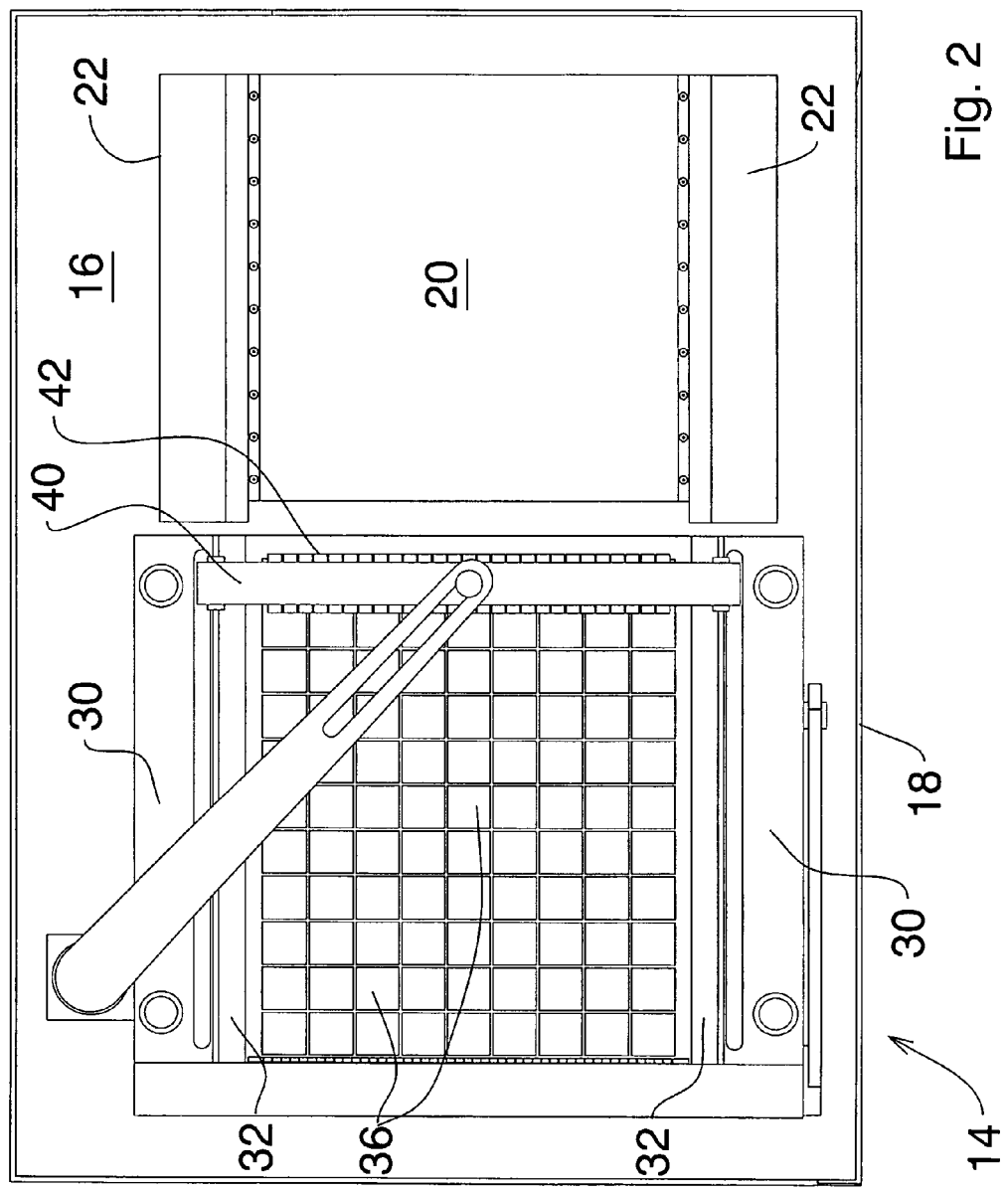
FIG. 2 is a top plan of the apparatus of FIG. 1.

FIG. 1 shows an apparatus (10) illustrating the invention, and having a panel magazine storage portion (12) and an active print-read portion (14), supported on a common base (16) and surrounded by a housing (18). Preferably the entire unit is sized to fit into the space occupied initially by a server rack device and eventually a typical hard drive.

The data carriers in this case are panels (20) described below (FIG. 5) and are stored in the magazine portion (12).

Figure 3:
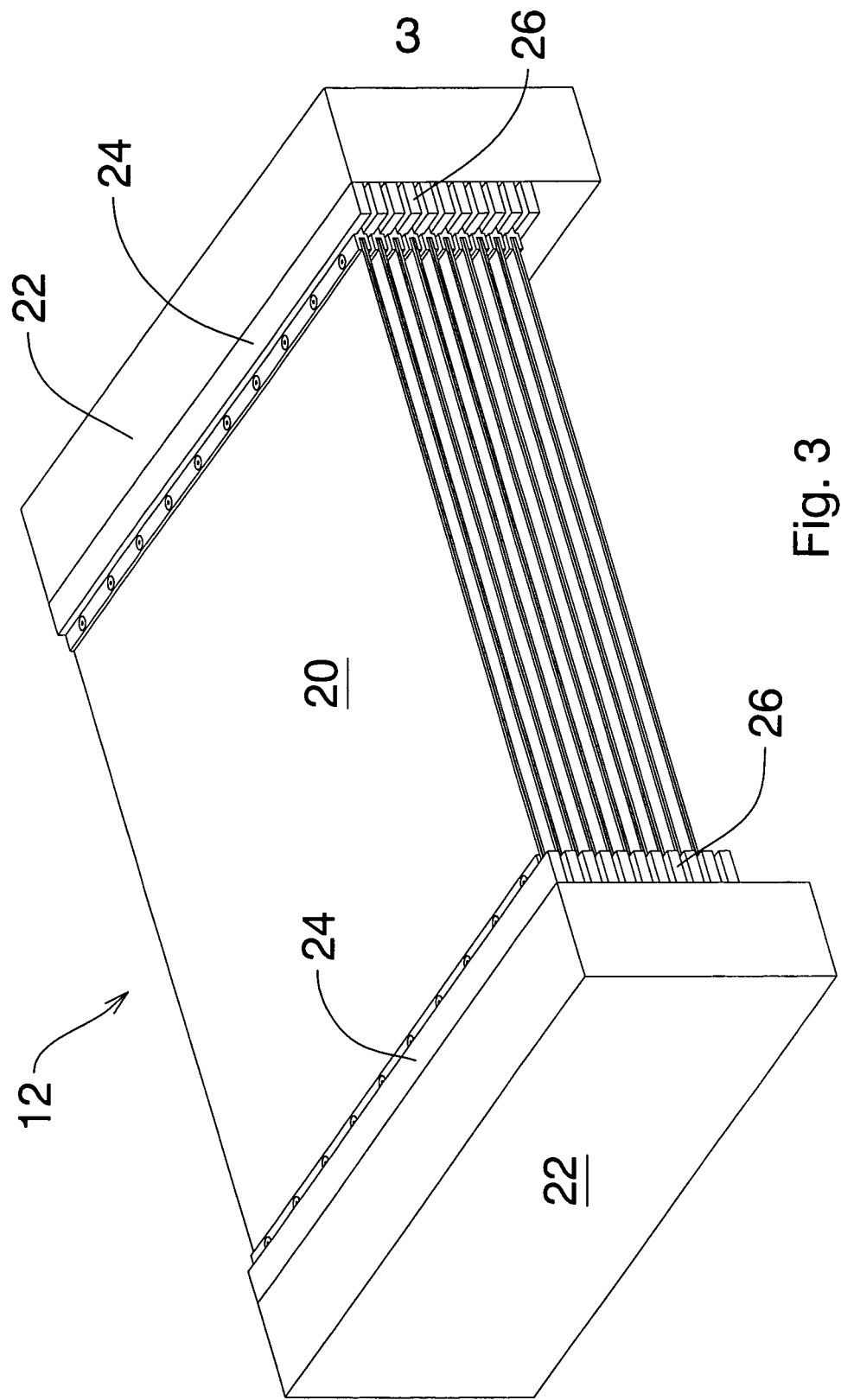
FIG. 3 is a schematic perspective of the magazine portion of the apparatus.

The magazine or storage portion has frames (22) supporting slide bars (24) supported on base (16). Bars (24) (FIG. 3) are formed with panel slots (26). The panels (20) can be slid into and out of the slots.

A panel transport mechanism (28) is operable to select a panel (20) and slide it out or to return it.

Figure 4:
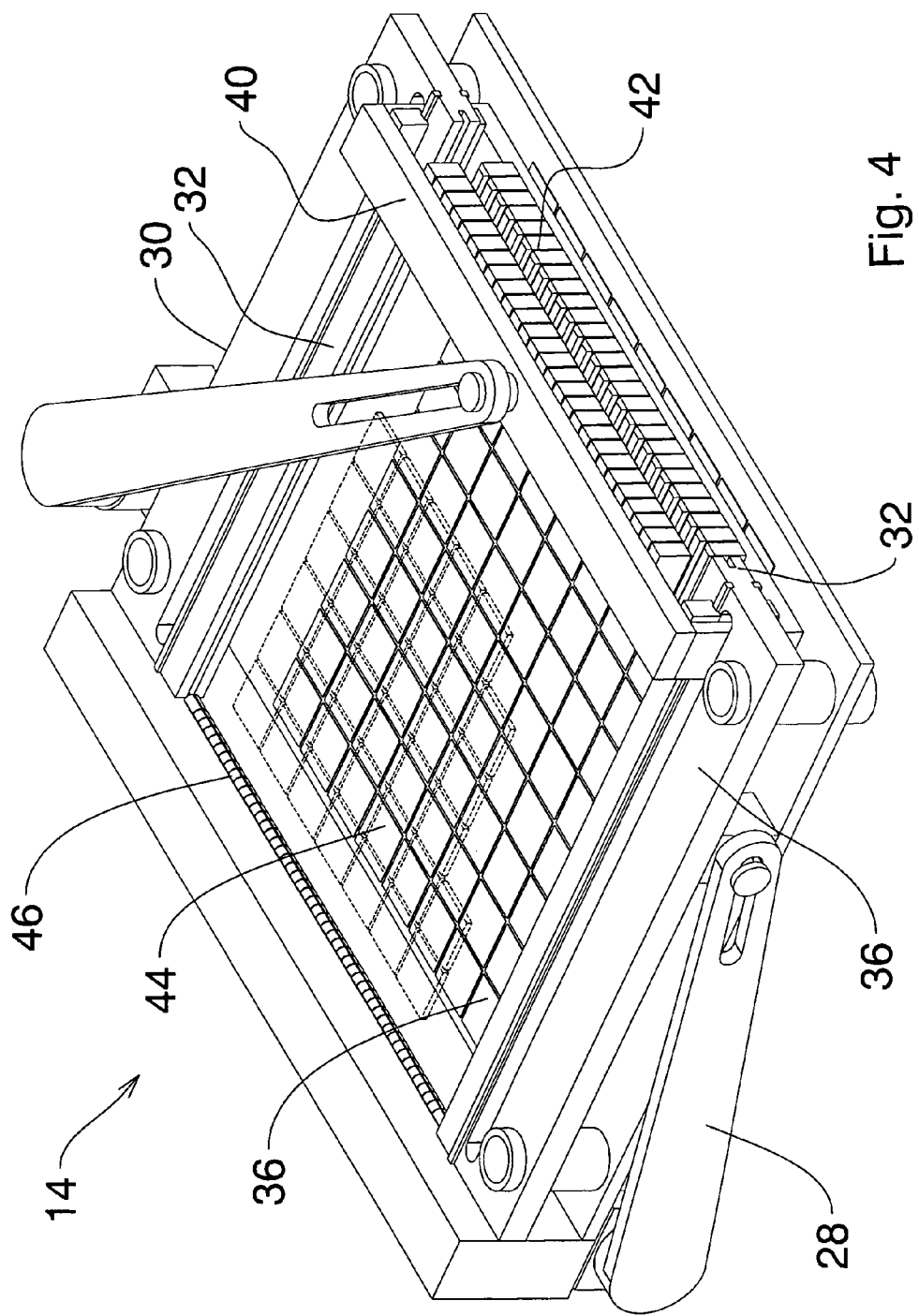
FIG. 4 is a schematic perspective of the print-read portion of the apparatus; and, FIG. 5 is a schematic perspective of a data storage carrier or panel, illustrating the invention.

The print-read active portion (14) (FIG. 4) has opposed side frames (30) supported on base (16).

Side members (32) on frames (30) have slots (34) to receive a selected panel. On base (16) there is an array of CMOS based camera elements, or readers (36) capable of imaging an entire panel.

A carriage bar (40) has Piezo-electric MEMS based print heads (42), and is moveable lengthwise between side members (32) to traverse a panel. The print heads, may be arranged side by side, or may be moveable transversely along bar (40), from one side to the other of the panel. They are operable to deposit ink symbols on the panel. They are connected to suitable data processors (not shown) for selective operation.

The panels (20) are double sided. They can receive print on their upper or their undersides. The print heads (42) are therefore mounted in double rows, one above and the other below, the panels (20).

Erasure of ink deposited is achieved by flash heating the panel and vaporizing the glycol based ink. A vacuum pump (not shown) vacuums the vapour and the particulate from the device.

Ink is supplied from a suitable ink supply that is thermally controlled and pressurized to ensure feed (not shown).

Illumination is provided in the form of a light bar (46), extending along the back of the print-read portion (14).

A second array of readers (44), shown in phantom, will preferably be supported in an upper region of print-read portion (14). In this way, data can be read on both sides on each panel (20).

Figure 5:
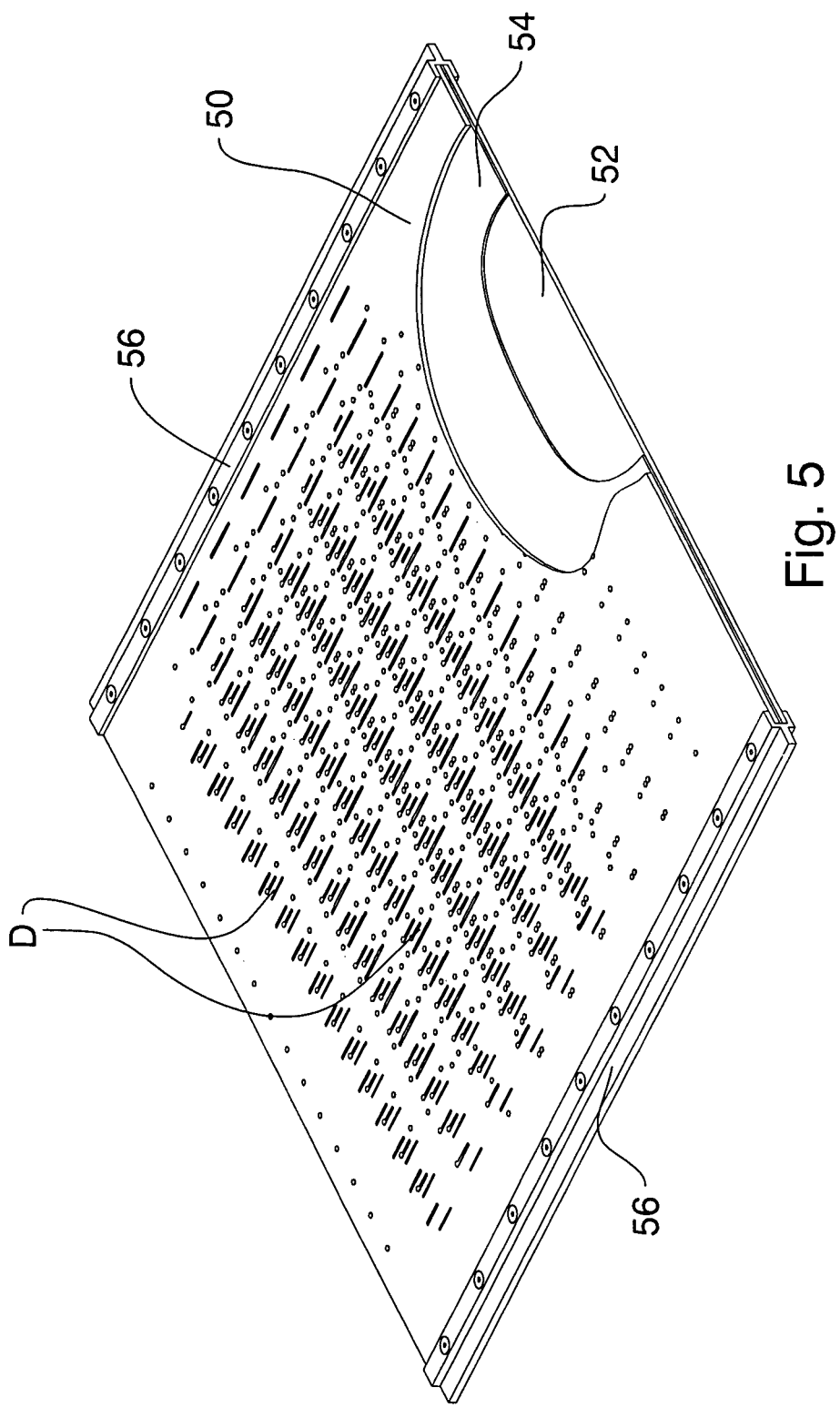

Each panel (20) preferably comprises, in this embodiment, a first glass sheet (50) (FIG. 5), a second glass sheet (52) (FIG. 5), and an intermediate sandwich layer (54) (FIG. 5). Layer (54) is highly reflective, so as to enable reading of symbols from either side. Strips (56) of magnetic material are secured along the two longitudinal side edges. This enables magnetic sensors (not shown) to select and position the panel in the print-read portion.

It is possible in an implementation to have more than one of the print-read portions installed in the assembly to enable the reading and writing on two panels simultaneously doubling overall device throughput.

Layer (54) may be a layer of paint or coating, or may be a sheet of highly reflective material. When saving data, a panel is transported out of magazine portion (12) into the print-read portion (14).

The method of operation will proceed as follows:

Data is encrypted into ink dot patterns or symbols D. A carrier panel is retrieved from storage and the data is imprinted on the panel. The panel is then returned to the magazine.

When reading data, the panel is again moved into the print-read portion.

The readers (36)(44) are then activated to read data on either the upper side or the lower side of the panel and the lights are activated. The data symbols are then processed into binary signals, for processing.

The entire sides of a panel can be imaged at one time as opposed to a hard disk drive that must pass over each individual magnetic bit to read it.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A data storage system, having a data processor operable to convert digital data signals into ink dot patterns, and operable to receive such ink dot patterns, and convert them into digital signals, and comprising:
    at least one print media receiving carrier;
    a printing member operable to deposit ink dot patterns in a print medium on said carrier; and,
    a print media reader operable to read said ink dot patterns and create data signals therefrom.

2. A data storage system as claimed in claim 1, and including a housing defining a storage area and an active area for storing said carriers.

3. A data storage system as claimed in claim 2, and including a carrier transport mechanism for transporting selected carriers from one said area to the other in said housing.

4. A data storage system as claimed in claim 3, wherein said printing member is mounted on a carriage bar, and transmission for moving said carriage bar within said housing relative to a said carrier.

5. A data storage system as claimed in claim 4, wherein said print media reader is mounted on said carriage bar and incorporates readers above and below the carrier, and lights for illuminating said carriers.

6. A data storage system as claimed in claim 5, and including a magnetic medium on respective carriers and enabling selection and positioning of a respective said carrier in said active area of said housing.

7. A data storage system as claimed in claim 6, and including an ink eraser, operable to remove ink dot patterns from a said carrier.

8. A data storage system as claimed in claim 7, wherein said eraser comprises an instantaneous heat source for vaporizing said ink dot patterns and a vacuum pump for removing vaporized ink.

9. A method of storing and retrieving data for use in a computer system and having data encryption for encrypting data into symbols, and data recovery for recovering data from said symbols, said method comprising:
    moving a carrier from a storage area to an active area;
    printing encrypted data symbols on a carrier, and storing the carrier in a storage area;
    retrieving a carrier from the storage area into the active area;
    reading said encrypted data on said carrier and returning said carrier from said active area to said storage area.

10. The method as claimed in claim 9, including the step of retrieving a said carrier from said storage area into said active area, and reading said symbols on said carrier, and encoding said symbols as binary symbols.

11. The method as claimed in claim 10, including removing said symbols from a said carrier, for re-use of the carrier.

* * * * *